United States Patent Office 3,299,194
Patented Jan. 17, 1967

3,299,194
ORIENTED FILMS OF ETHYLENE POLYMERS
Ralph Crosby Golike, Tonawanda, N.Y., assignor to E. I. du Pont de Nemours and Company, Wilmington, Del., a corporation of Delaware
No Drawing. Filed Mar. 9, 1964, Ser. No. 350,597
12 Claims. (Cl. 264—210)

This invention relates to polymeric sheet structures and more particularly to heat-shrinkable sheet structures such as films, ribbons, netting and the like, of ethylene polymers, and to the process for producing such structures. This application is a continuation-in-part of my copending application Serial No. 119,309, filed June 26, 1961.

Various approaches have been taken in an attempt to provide sheet materials, and in particular, films, suitable for producing skin-tight coverings on items packaged therein. Films of unvulcanized rubber and of certain types of vinylidene chloride polymer films have been used to provide such skin-tight coverings in the packaging field. Some of these films show a tendency to become brittle at the temperatures required for frozen storage or storage under refrigerating conditions; consequently, the packages frequently split and the desired results are not maintained. And, too, certain of the films require an inconveniently high temperature for the shrinkage on the package to occur and many of the films do not have sufficiently good clarity for effective display of packaged articles. It has been determined that films suitable for producing skin-tight coverings on commodities packaged therein should have a percent shrinkage of at least 15% along each axis when subjected to boiling water, and a shrinkage tension of at least 150 grams/inch/mil at 100° C.

Because of its excellent low temperature durability and its good combination of chemical and physical properties, polyethylene film has been used extensively in the general wrapping field and attempts have been made to adapt it as a heat-shrinkable wrap for various articles. These attempts, however, have not been entirely successful. In one proposal, for example, special heat-shrinkage baths are required, many of which leave a residue on the surface of the film which must be removed. In another proposal the film is subjected to high energy irradiation which adds substantially to the cost of the film. Furthermore, in most instances the degree of shrinkage obtained is too low, i.e., is below 15%, or the shrinkage tension is insufficient, below 150 grams/inch/mil, to insure conformity of the film, on shrinkage, to irregular shaped bodies.

Accordingly, it is an object of this invention to provide a film or like sheet structure, suitable for shrinkage onto objects packaged therein to provide an attractive economical, highly durable, heat-sealable, skin-tight package.

A further object is to provide a heat-shrinkable ethylene polymer film which is economical and which has a degree of shrinkage in each of two mutually perpendicular directions of the film, and a shrinkage tension, sufficiently high to insure conformity of the film, on shrinkage, to irregularly shaped objects. The foregoing and other objects will more clearly appear from the description which follows.

These objects are realized by the present invention which, briefly stated, comprises forming a self-supporting sheet structure, e.g., film, from a homogeneous blend of (1) 70% to 85% by weight based on the total weight of the blend, of a low density polymer selected from the group consisting of polyethylene and copolymers of ethylene with olefinically unsaturated monomers polymerizable therewith, said polymer having a density of from 0.91 to 0.93 gram/cc. at 25° C., and (2) from 30% to 15% by weight of a high density linear polymer selected from the group consisting of linear polyethylene and linear copolymers of ethylene with olefinically unsaturated monomers polymerizable therewith, said high density linear polymer having a density of from 0.94 to 0.98 gram/cc. at 25° C.; stretching said film in each of two mutually perpendicular directions of the film to at least 3× (three times the original dimension of the film) in each direction at a temperature between about 95° C. to about 115° C., and thereafter cooling said film whereby to produce a heat-shrinkable film having a percent shrinkage of at least 15% along each axis in the plane of the film when subjected to the temperature of boiling water, i.e., 100° C., and a shrinkage tension of at least 150 grams/inch/mil at 100° C.

The preferred blend of polymers for purposes of this invention contains from 75% to 80% by weight, based on the total weight of the blend of the low density polymer resin. However, useful films and like sheet structures can be produced containing as little as 70% and as much as 85% by weight of low density polymer. The low density resin may also comprise, in whole or in part, copolymers of ethylene such as those produced by free radical catalysis with monomers of the type of vinyl acetate, methyl methacrylate, ethyl acrylate, styrene, vinyl methyl ether, diisobutylene, methacrylic acid, and acrylonitrile, the important criterion being that the density of the copolymer be in the range of 0.91 to 0.93, and preferably within the range of 0.91 to 0.925 gram/cc. at 25° C. Similarly, the high density polymer resins may comprise in place of, or in addition to linear homopolymers of ethylene, linear copolymers thereof, especially those producible by coordination-type catalysis. Suitable monomers copolymerizable with ethylene to produce linear copolymers include the α-olefins having 3 to 20 carbon atoms such as propylene, n-butene-1, n-pentene-1, n-hexene-1, n-heptene-1, n-octene-1, n-decene-1, 4-methylpentene-1, n-tetradecene-1 and n-octadecene-1, as well as mixtures of certain of these monomers, such as heptene-1/octene-1/nonene-1 mixtures, the important criterion being that the density of the polymer should fall in the range of 0.94 gram/cc. to .98 gram/cc. at 25° C., and preferably in the range of 0.94 to 0.975 gram/cc. at 25° C. Density is determined by preparing the sample as described in ASTM–1248–60T and measuring its density following the method of ASTM–D–1505–57T. In the preferred embodiment of this invention a blend of about 75% to 80% of low density (branched) polyethylene and 25% to 20% of high density (linear) polyethylene having a melt index below 2.0 is employed. It is preferred that a conventional slip promoting additive for polyethylene film be incorporated in the blend.

The low and high density polymer resins in the relative proportions above stated may be blended by any conventional blending technique effective to produce a uniform homogeneous blend; and the resulting blend may be extruded, preferably from a melt of the blend, in flat or tubular film, or integral net-like form by any of the extrusion processes heretofore employed in the production of thermoplastic polymeric film and netting.

The resulting film (or like structure) is thereafter biaxially oriented by suitably stretching it in each of two mutually perpendicular directions in the plane of the film to the extent of at least 3× (i.e., at least three times the original dimension of the film in each direction), and preferably within the range of 3× to 7×, and at least 5× in one direction of the film. Stretch ratios as high as 10× or more may be employed. It is desirable in some cases that the amount of shrinkage be essentially the same in both directions in which case the stretching in both directions may be done simultaneously. An alternative is to post-stretch the film along the axis having the lower shrinkage to the extent that balanced shrinkage in both directions is realized. There are other situations wherein it is desirable that the extent of shrinkage in one direction may be more or less than in the other direction. To realize this, a sequential stretching is best employed. In general, the amount of stretch in a given direction or the ratio of stretch in the two directions or the order of stretching in one direction or the other is dictated by the amount of shrinkage desired along the given axis. For best results, stretching is carried out at a temperature of about 100° C. to about 110° C. However, the films can be stretched at temperatures as low as 95° C. and up to about 115° C. The amount of stretch required and the temperature at which stretching is carried out are inter-related. That is, as temperature is increased, a greater amount of stretch is required to effect a given amount of desired orientation in the sheet. The converse is true as temperature is decreased.

For many purposes it is desirable to modify certain of the characteristics of film by applying to one or both surfaces of the film a suitable coating composition. Depending upon the properties desired, these heat-shrinkable films can be coated before or after stretching with either aqueous or organic solvent dispersions of the vinylidene chloride copolymer coatings as well as with the coatings based on nitrocellulose, and other film-forming resins such as branched polyethylene, chlorinated branched polyethylene, ethylene/vinyl acetate copolymer, ethylene/vinyl acetate copolymer-wax compositions, polyamides, polyesters, polyethers, cellulose ethers and haloolefin polymers. To provide a film which will be free from fogging when wrapped on high moisture content articles the film may be treated with an electric discharge or similar treatment to modify its adherability characteristics after which a wetting agent such as an alkyl sulfate is applied.

It is not understood why the oriented film of the blend of polymers of this invention will undergo substantial shrinkage and, in general, further exhibit high shrinkage tension (i.e., a shrinking tension of at least 150 grams/inch/mil at 100° C.) when subjected to heat, while an oriented film produced from high density polyethylene will not undergo shrinkage to any appreciable extent, and an oriented film of low density polyethylene will generally not shrink to the extent necessary to conform to the shape of the article being packaged. However, it is speculated that there are probably nucleation sites formed by virtue of the differences in the crystallization characteristics of the high and the low density polyethylenes and that these then serve as points in the structure wherein strains are developed by the two-way stretching. When the film is heated subsequently the stresses are relieved by retraction of the film to its former dimension.

The following examples will serve to more fully illustrate the principles and practice of this invention:

EXAMPLE 1

A blend of 75% by weight of "Alathon"[1]-1413 low-density (0.915 gram/cc.) polyethylene resin and 25% "Alathon"-7020 high-density (0.958) gram/cc. polyethylene resin in flake form was blended on a ball mill together with 1000 parts per million (by weight) of an additive comprising "Armid"[2]-O, "Armid"[2]-HT, 2,6-di-tertiary butyl-4-methylphenol and silica in the weight ratio of 1, 1, 2, 2 respectively.

The resulting blend having a density of 0.925, a crystalline melting point of 125° C. and a melt index of 0.39 was melt extruded through a 2-inch annular extrusion die at a melt temperature of 215° C., and at the rate of 2.5 ft./min., to form a tubular film 2 inches in diameter. The extruded tubing was then passed over an internal quenching mandrel maintained at 25° C., after which it was passed through an initial external heating zone wherein the temperature of the tubing was raised to 100° C.; thereafter it was passed into a final heating zone wherein an internal heater raised the temperature of the tube to 115° C., whereupon the tubing was expanded circumferentially to a diameter of 10 inches by means of internal gas pressure, and stretched longitudinally by an increase in draw-off speed to 12.5 ft./min. The stretched tubing was thereafter cooled and slit to form a flat film stretched 4.6× in the axial or longitudinal (MD) direction of the film and 5× in the transverse (TD) direction (Film A).

A second and third film (Film B and Film C, respectively) were prepared following the above procedure and conditions except that the tubing was expanded to a greater extent. The characteristics of the resulting films are tabulated in the following table:

TABLE I

| Film | Stretch Ratio | | | Gauge | Initial Tensile Modulus, p.s.i.×10$^{t3}$ | | Elongation, percent | | Tensile Strength, p.s.i.×10$^{t3}$ | | Shrinkage, percent at 100° C. | |
|---|---|---|---|---|---|---|---|---|---|---|---|---|
| | T.D. | M.D. | M.D./T.D. | | T.D. | M.D. | T.D. | M.D. | T.D. | M.D. | T.D. | M.D. |
| A | 5 | 4.6 | 0.92 | 1.25 | 78 | 92 | 78 | 137 | 10.3 | 7.4 | 24.7 | 17.0 |
| B | 5 | 5.9 | 1.18 | 0.93 | 83 | 70.5 | 84 | 128 | 10.2 | 7.6 | 23.4 | 17.3 |
| C | 5 | 8.9 | 1.78 | 0.75 | 62 | 84 | 97 | 53 | 9.7 | 17.1 | 26.5 | 19.7 |

A control film made from the same resin blend by the blown extrusion method, as exemplified in U.S. Patent 2,461,975, at an extrusion temperature of 175° C. and at a blow-up ratio of 3/1 showed a shrinkage of 2–4% when immersed in boiling water.

*Tensile strength, elongation and initial tensile modulus* are normally measured at 23.5° C. and 50% relative humidity, although they may also be measured at other specified temperatures and humidities. They are determined by elongating the film sample in an Instron tensile tester at a rate of 100% per minute until the sample breaks. The force applied at the break in p.s.i. is the tensile strength. The elongation is the percent increase in the length of the sample at breakage. Initial tensile modulus in p.s.i. is directly related to the film stiffness. It is obtained from the slope of the stress-strain curve at an elongation of 1%. Both tensile strength and initial tensile modulus are based upon the initial cross-sectional area of the sample.

*Shrinkage* is determined by measuring a given area on a sheet of film, dipping the film in boiling water for 30 seconds, noting the change in dimension and calculating percent shrinkage, based on the original dimension.

*Melt index* is determined as described in ASTM–D–1238–52T.

*Crystalline melting point* is measured by viewing the

---
[1] "Alathon" Polyethylene Resin—E. I. du Pont de Nemours & Co.
[2] Long Chain Amides—Armour & Co. "Armid"-O is a mixture of fatty acid amides consisting of 91% by weight of oleamide, 6% of octadecanamide, and 3% of linoleamide; "Armid"-HT is a mixture of fatty acid amides consisting of 25% by weight of hexadecanamide, 70% octadecanamide, and 5% octadecenamide.

resin through a polarizing microscope as it is heated and determining the temperature at which birefringence disappears. The temperature at which birefringence completely disappears is taken as the crystalline melting point.

EXAMPLE 2

The polyethylene blend described under Example 1 was extruded at a temperature of about 275° C. through a flat die into a quench bath held at 30° C. to give a sheet approximately 9 mils thick. Samples of the sheet (Films D, E, F, G and H) were then stretched 3× in each direction simultaneously in a tenter frame under the conditions noted in the table below. Films G and H represent products within the scope of the invention. Film D illustrates the effect of too high a stretch temperature; while Films E and F demonstrate the interdependence of stretch temperature and amount of stretch, i.e., at the maximum temperatures it may be necessary to stretch the film to a greater extent (more than 3×) than would be required at a lower stretch temperature, cf., films G and H.

TABLE III

| Composition | Film I[1] | Film J[2] | Film K[3] |
|---|---|---|---|
| Density | 0.9260 | 0.9251 | 0.9358 |
| Melt Index | 0.9 | 0.9 | 0.27 |
| Gauge | 1.8 | 0.90 | 1.0 |
| Stretch Ratio | 3.5/3.5 | 7/7 | 7/7 |
| Tensile, p.s.i.×10$^{-3}$ | 4.7/7.5 | 10.7/15.1 | 16.3/15.7 |
| Percent Elongation | 324/147 | 112/55 | 123/61 |
| Initial Tensile Modulus, p.s.i.×10$^{-3}$ | 65/75 | 69/95 | 131/147 |
| Tear, g./mil | 20.0/11.9 | 6.8/4.9 | 7.8/5.8 |
| Impact, kg.-cm./mil | 2.02 | 2.97 | 3.50 |
| PV/mil | 69 | 57 | 44 |
| Heat Seal (220° C., 0.15 sec.) | 450 | 620 | |
| Percent Shrinkage, 100° C. | 16/25 | 22/38 | 11/20 |

[1] 75% "Alathon"-1413, 25% "Alathon"-7020.
[2] 75% "Alathon"-1413, 25% "Alathon"-7020.
[3] 50% "Alathon"-1413, 50% "Alathon"-7020.

A film of "Alathon"-1413 extruded and stretched under the conditions of Film J had a very tacky surface and did not shrink when dipped in boiling water. A film of "Alathon"-7020 made under the same conditions

TABLE II

| Film | Stretch Temperature, ° C. | Tensile Strength, p.s.i.×10$^3$ | Elongation, percent | Initial Tensile Modulus, p.s.i.×10$^3$ | Pneumatic Impact, kg.-cm./mil | Shrinkage, percent at 100° C. | |
|---|---|---|---|---|---|---|---|
| | | | | | | T.D. | M.D. |
| D | 121 | 4.2 | 187 | 47.6 | 2.07 | 8.8 | 9.2 |
| E | 115 | 6.4 | 204 | 59.6 | 3.03 | 10.0 | 10.0 |
| F | 111 | 6.8 | 187 | 60.7 | 3.16 | 11.2 | 10.8 |
| G | 105 | 6.6 | 210 | 53.9 | 3.13 | 16.8 | 17.3 |
| H | 100 | 6.8 | 190 | 46.6 | 3.40 | 24.3 | 23.8 |

*Pneumatic impact strength* or *impact strength* is the energy required to rupture a film. It is reported in kilograms-centimeters per mil thickness of the sample. The pneumatic impact strength is determined by measuring the velocity of a ball mechanically accelerated by air pressure, first in free flight and then in a flight impeded by rupturing the test sample. In this test, the film sample is 1¾ inch x 1¾ inch. The projectiles are steel balls ½ inch in diameter and weighing 8.3 grams. The free flight velocity is 23 meters per second. The velocities are measured by timing photoelectrically the passage of the steel balls between two light beams set a definite distance apart. The pneumatic impact strength is measured by the loss in kinetic energy due to the rupturing of the test sample. It is calculated from the following formula:

Constant×(Square of velocity in free flight
—square of velocity in impeded flight)

where the constant is directly proportional to the weight of the projectile and inversely proportional to the acceleration due to gravity. This test is carried out at 23° C. and 50% relative humidity and the test samples are conditioned for 24 hours at 23° C. and 50% relative humidity.

EXAMPLE 3

Following the procedure described in Example 1, films were extruded and stretched from blends of "Alathon"[1]-1413 and "Alathon"-7020 in the ratios shown in the table below. The characteristics of the films produced are shown in the following table.

[1] "Alathon" Polyethylene Resin—E. I. du Pont de Nemours & Co.

showed essentially no shrinkage at 100° C. Further, a 75%/25% by weight blend of low density/high density polyethylenes having a melt index of 2.85 could not be stretched satisfactorily in the same process.

The *tear* test is carried out in an Elmendorf tester as described in ASTM-689-44.

*Heat seal* strength is measured by cutting a piece of film 4 inches by 10 inches with the grain running in the long or machine direction into two pieces 4 inches by 5 inches each. The two pieces are superimposed so that opposite surfaces are in contact. The two pieces of superimposed film are then sealed together at each end at right angles to the grain. A ¾ inch wide sealing bar heated to a temperature of 220° C. at 20 p.s.i. pressure contacts the ends for 0.15 second. The sealed sheets are then cut in half at right angles to the grain. From the center of the two resulting pieces, 1½ inch wide strips parallel to the grain are cut. The resulting four sets of strips are tested by opening set at the free ends, placing them in a Suter testing machine and pulling them apart. The highest force in grams required to pull the strips apart is taken as a measure of the heat seal bond strength.

*Initial moisture permeability (IPV)* is measured by placing a single sheet of the film over the top of an aluminum cup containing 15 milliliters of water, the test area being 33.3 cm.$^2$. The assembly is weighed accurately and then placed in a dry (less than 3% RH) air-swept oven at 39.5° C. for 48 hours. The assembly is removed from the oven, cooled to room temperature and re-weighed. The weight loss is converted to grams of water lost per 100 square meters per hours. The values given in the examples are the grams of water lost/100 m.$^2$/hour for the second 24-hour period.

EXAMPLE 4

A. Shrinkage tension

Films consisting of a blend of 75% by weight "Alathon"[1]-1413 and 25% by weight of "Alathon"-7020 were stretched 7× by 7× at a temperature of 100° C. and then subjected to the following test. A rectangular piece of film was fastened to a rectangular frame with all four edges of the film being secured. One of the frame segments holding opposite edges of the film along one axis was secured to a fixed position and the opposite was attached to a Dynisco Strain Gage (No. 5922), which in turn was connected to a Sanborn Recorder. A current of air at the controlled temperatures shown below was impinged on the film surface for approximately 30 seconds. The tension measured as the force in grams exerted by the film was recorded both with the heat on, that is, with air impinging on the film at the specified temperature, and also at room temperature after the film sample had cooled. The measurements are expressed as grams/inch/mil. The results of these measurements along with comparable results for the commercial, heat-shrinkable, biaxially oriented, irradiated polyethylene film sold under the trademark Cryovac L (W. R. Grace Co.), are shown in the table below.

TABLE IV

| "Alathon"-1413/"Alathon"-7020 (75/25) | | | Cryovac L | | |
|---|---|---|---|---|---|
| Temperature, °C. | Heat On, g. | Heat Off, g. | Temperature, °C. | Heat On | Heat Off |
| 84 | 122 | 202 | 80 | 0 | 0 |
| 96 | 197 | 320 | 92 | 47 | 86 |
| 109 | 280 | 435 | 95 | 98 | 164 |
| 118 | 235 | 433 | 103 | 171 | 262 |
| 131 | 241 | 381 | 110 | 237 | 341 |
| 140 | 121 | 298 | 118 | 264 | 365 |
|  |  |  | 126 | 175 | 304 |
|  |  |  | 130 | 102 | 245 |

It will be observed that the "Alathon"-1413/"Alathon"-7020 blend has greater retractive force throughout the temperature range, a characteristic which lends itself well to the contouring of the film on shrinkage around irregularly shaped items to be wrapped.

B. Packaging characteristics

In further comparison of the films of this invention with a commercial film such as Cryovac L, it was found that films made from the "Alathon"-1413/"Alathon"-7020 blend could be readily heat sealed on packages using a hot wire sealer or impulse sealer, for example, without the appearance of puckering at the seal line which generally accompanies the sealing of Cryovac L.

Also, the films made from the blends of this invention have better surface properties than the Cryovac L films; films of the blends ran well on a standard type of wrapping machine, whereas Cryovac L film showed a tendency to cling to the metal parts of the machine and not function smoothly in wrapping operations.

EXAMPLE 5

Effect of blend composition on film shrinkage

Films were produced following the procedure of Example 1 employing a blend of "Alathon"-1413 low density (0.915) polyethylene resin and "Alathon"-7020 high density (0.958) polyethylene resin. Extrusion temperature was held at approximately 215° C.; temperature of the 2 inch diameter extruded tube as it advanced through the orientation zone was in the range of 100° C.; the internal gas pressure on the expanding tube was as shown in the table. The results for the various proportions of low and high density polymer in the blend are shown in Table V.

It will be observed that films of polymer blends containing low density polyethylene above and below the limits herein specified do not yield stretched films having the requisite combination of shrinkage and shrinkage tension.

TABLE V

| Film No. | LDPE/HDPE, Ratio | Stretch Ratio MD×TD | Bubble Pressure (In. of water) | Shrinkage | |
|---|---|---|---|---|---|
|  |  |  |  | Percent MD/TD, 100° C., 1 min. | Tension (g./in./mil) |
| 1 | 50/50 | 7.0×7.0 | 6.0 | 10/20 | 220 |
| 2 | 60/40 | 5.2×5.2 | 5.8 | 12/25 | 235 |
| 3 | 75/25 | 5.8×5.2 | 5.8 | 18/34 | 300 |
| 4 | 80/20 | 5.2×5.2 | 3.4 | 20/33 | 200 |
| 5 | 85/15 | 5.2×5.0 | 4.0 | 26/33 | 150 |
| 6 | 90/10 | 5.2×5.0 | 4.0 | 23/33 | 70 |

Legend:
LDPE Low density polyethylene resin.
HDPE High density polyethylene resin.

[1] "Alathon" Polyethylene Resin—E. I. du Pont de Nemours & Co.

EXAMPLES 6–14

Resin blends of the compositions shown below were extruded at a temperature of 270° C. through a flat die into a quench bath held at 30° C. to give sheets approximately 20 mils thick. These sheets were stretched simultaneously 5× in the MD and TD directions in a tenter frame at 105° C. and were thereafter tested for extent of shrinkage upon 30 seconds immersion in boiling water.

TABLE VI

| Example | Low Density Ethylene Polymer | | | High Density Ethylene Polymer | | | Weight Ratio Low Density/ High Density Polymers | Percent Shrinkage [1] |
|---|---|---|---|---|---|---|---|---|
| | Comonomer | Weight Percent | Density | Comonomer | Weight Percent | Density | | |
| 6 | Vinyl Acetate | 7.5 | .929 | 0 | 0 | .9757 | 75/25 | 22 |
| 7 | Ethyl Acrylate | 3.5 | .927 | 0 | 0 | .955 | 75/25 | 22 |
| 8 | Methyl Methacrylate | 6.3 | .926 | n-Heptene-1 | 1.4 | .949 | 75/25 | 17 |
| 9 | Methacrylic Acid | 1.2 | .926 | n-Octene-1 | 2.0 | .943 | 75/25 | 20 |
| 10 | 0 | 0 | .915 | Octadecene-1 | 2.0 | .942 | 75/25 | 16 |
| 11 | 0 | 0 | .915 | n-Decene-1 | 0.3 | .948 | 75/25 | 18 |
| 12 | Methyl Vinyl Ether | 11.3 | .922 | 0 | 0 | .955 | 80/20 | 32 |
| 13 | 0 | 0 | .918 | n-Butene | 2.0 | .943 | 80/20 | 35 |
| 14 | 0 | 0 | .918 | Heptene-1/Octene-1/Nonene-1 (10/80/10) | 2.0 | .940 | 80/20 | 30 |

[1] Essentially the same shrinkage in TD and MD directions.

EXAMPLE 15

In order to improve the barrier properties of the heat shrinkable films a coating was applied. A film made from a blend of 75% "Alathon"-1413/25% "Alathon"-7020 and stretched to a ratio of 5× in both the TD and MD directions at a temperature of 105° C. was passed at a rate of 25 feet per minute between the electrodes of an electric discharge treating apparatus. The film so treated was then passed through an aqueous dispersion of a vinylidene chloride copolymer and dried at 90° C. The resulting film was readily heat sealable and showed a maximum kerosene vapor permeability of about 5 grams/100 m.$^2$/ hour as compared with an uncoated film which had a corresponding kerosene vapor permeability of 670 grams/ 100 m.$^2$/hour.

It is to be understood that in addition to flat film the compositions of this invention in the form of net-like structures such as are described in U.S. Patent 2,919,467, and in the form of ribbed sheeting, ribbons, etc., also yield heat-shrinkable structures when submitted to the process of this invention. For example.

EXAMPLE 16

A resin blend of 80% by weight of "Alathon"-1413 and 20% by weight of "Alathon"-7020, having a crystalline melting point of 120° C. and a melt index of 1.01 was extruded at a melt temperature of 250° C. into the form of a tubular net-like structure following the procedure described in U.S. Patent 2,919,467. The resulting structure was stretched simultaneously to a ratio of 5× in both the TD and MD directions at a temperature of 105° C. The stretched net tubing was encased as a sleeve around a bundle of aluminum rods and thereafter heated in a stream of hot air at 100° C. for one minute. An attractive, tight package was obtained.

EXAMPLE 17

The resin blend of Example 15 was extruded into the form of ribbed sheeting following the procedure described in patent application Serial No. 65,089 filed October 26, 1960, by Frank Brian Mercer. The ribbed sheeting was stretched 5× simultaneously in both the MD and TD directions at 103° C. Upon immersion for 30 seconds in boiling water, the stretched ribbed sheeting showed a shrinkage of 20% in both the MD and TD directions.

A salient advantage of this invention is that it provides an outstanding, low cost heat-shrinkable film. Added separate processing steps are not required for the production of film which has the heat shrinking characteristics, or for the subsequent application thereof.

Furthermore, the films and like sheet structures of this invention have exceptionally high shrinking tension, a factor which makes them very well suited to the packaging of items having irregular surfaces so that a well conformed, skin-tight package is insured. Still further, the polyethylene films of this invention show excellent durability characteristics at low temperature, which is very essential because skin-tight packaging is being employed to an increasing extent in the wrapping of food-stuffs such as poultry, meats, and various meats which are held in refrigerated storage or in frozen conditions for long periods of time. The advantage of this feature thus becomes readily evident. Still further, these films have good clarity, a feature which is most valuable for effective display of articles in shrink packages, they can be readily heat sealed to give packages free of unsightly puckering at the seal and, because of their good surface properties, they can be used more efficiently on wrapping machines than present commercial films.

The films of this invention, like the heat-shrinkable films already introduced to the trade, are useful in a variety of applications such as shrink covers for use on aluminum foil and molded pulp trays for bake goods and the like. They are useful also in shrink tube packages wherein elongated articles such as window shades, shelf linings and the like are rolled into small rolls and inserted into a sleeve of the tubing, the tubing sleeve is then heated to shrink the tubing, thus affording a very compact, readily handled package. Another type of package is the shrink sleeve package wherein elongated trays of vegetables such as celery or fruit, eggs and the like may be overwrapped with the sleeve, the sleeve is then shrunk in place, leaving a very compact tight package with open ends for ventilation. Still another application is the packaging of fresh produce such as lettuce, broccoli, celery and the like in a wrapping of the film of this invention wherein the package is twisted and then heated slightly to shrink the package into a compact unit. Still other applications include multi-packaging of cans, bottles, golf balls, light bulbs, electronic supplies such as radio tubes, and in replacement of carton dividers, use as tray covers and as direct warps on such products as bacon, frankfurters, fresh meat and fresh poultry. These films can also be used as wraps on processed meats and on such dairy products as cheese. They can also be used in the form of contour bags for wrapping of smoked meats, sausage products and frozen poultry. They can be used as shrink covers in baked goods, food containers, containers for metal parts such as hardware, for textiles, candy and the like, as shrink sleeves on cartons of household items such as spices, on cups, dishes, silverware, paint brushes, electrical core packs, combination packs of several different articles, on rolls of film, paper, metal foil, as tape strips for packaging small items such as washers, nuts, bolts, buttons, as bubble type display packages of cosmetics, small hardware, electronic parts and household items.

I claim:
1. A process for producing a heat-shrinkable sheet structure which consists of the sequential steps of forming a self-supporting, unoriented sheet from a homogeneous blend of (1) from 70% to 85% by weight, based on the total weight of the blend, of a low density polymer selected from the group consisting of polyethylene, and copolymers of ethylene with olefinically unsaturated monomers copolymerizable therewith, said polymer having a density within the range of 0.91 to 0.93 gram/cc. at 25° C. and (2) from 30% to 15% by weight of a high density linear polymer selected from the group consisting of linear polyethylene and linear copolymers of ethylene with olefinically unsaturated monomers copolymerizable therewith to form linear copolymers, said high density linear polymer having a density within the range of 0.94 to 0.98 gram/cc. at 25° C.; stretching said sheet in each of two mutually perpendicular directions in the plane of the sheet to at least three times the original dimension of the sheet in each direction at a temperature between about 95° C. to about 115° C. and therefore cooling said sheet.

2. The process of claim 1 wherein said sheet is a self-supporting film.

3. The process of claim 2 wherein the film is stretched from 3 to 7 times its original dimension in each direction.

4. The process of claim 2 wherein the stretch in one direction is at least five times the original dimension of the film in said direction.

5. The process of claim 2 wherein the low density polymer constitutes from 75% to 80% of the total weight of the blend.

6. The process of claim 2 wherein the film is stretched at a temperature within the range of 100° C. to 110° C.

7. A process for producing heat-shrinkable polyethylene film which consists of the sequential steps of forming a self-supporting, unoriented film from a homogeneous blend of (1) from 70% to 85% by weight, based on the total weight of the blend, of low-density branched chain polyethylene having a density in the range of 0.91 to 0.93 gram/cc. at 25° C., and (2) from 30% to 15% by weight of high density linear polyethylene having a density within the range of from 0.94 to 0.98 gram/cc. at 25° C.; stretching said film in each of two mutually perpendicular directions in the plane of the film to at least three times the original dimension of the film in each direction at a temperature between about 95° C. to about 115° C. and thereafter cooling said film.

8. The process of claim 7 wherein the film is stretched from 3 to 7 times its original dimension in each direction.

9. The process of claim 7 wherein the stretch in one direction is at least five times the original dimension of the film in said direction.

10. The process of claim 7 wherein the low density polyethylene constitutes 75% to 80% of the total weight of the blend.

11. The process of claim 7 wherein the low density polyethylene has a density within the range of 0.91 to 0.925 gram/cc. at 25° C. and the high density polyethylene has a density within the range of 0.94 to 0.975 gram/cc. at 25° C.

12. The process of claim 7 wherein the film is stretched at a temperature within the range of 100° C. to 110° C.

References Cited by the Examiner

UNITED STATES PATENTS

| | | | |
|---|---|---|---|
| 2,405,933 | 8/1946 | Alderson | 260—23 |
| 2,919,467 | 1/1960 | Mercer | 18—12 |
| 2,928,132 | 3/1960 | Richards | 264—289 |
| 2,952,867 | 9/1960 | Diedrich et al. | 264—98 |
| 2,975,484 | 3/1961 | Amborski | 264—289 |
| 2,983,704 | 5/1961 | Roedel | 260—45.5 |
| 3,022,543 | 2/1962 | Baird et al. | 264—209 |
| 3,051,987 | 9/1962 | Mercer | 18—12 |
| 3,141,912 | 7/1964 | Goldman et al. | 264—290 X |

OTHER REFERENCES

"Plastic Net by Extrusion," Plastics, Temple Press Ltd., London, vol. 23, No. 244 (January 1958), TP 986 A1P62, p. 5 relied on.

MORRIS SUSSMAN, *Primary Examiner.*

ALEXANDER H. BRODMERKEL, ALEXANDER WYMAN, *Examiners.*

A. L. LEAVITT, G. D. MORRIS, *Assistant Examiners.*